United States Patent [19]
Tajima

[11] Patent Number: 5,058,040
[45] Date of Patent: Oct. 15, 1991

[54] SIMULATION OF A CHANGE IN THREE-COMPONENT COLOR VALUES BY USING TWO-COMPONENT COLOR VALUES

[75] Inventor: Joji Tajima, Tokyo, Japan

[73] Assignee: NEC Corporation, Tokyo, Japan

[21] Appl. No.: 596,425

[22] Filed: Oct. 11, 1990

Related U.S. Application Data

[63] Continuation of Ser. No. 173,164, Mar. 25, 1988, abandoned.

[30] Foreign Application Priority Data

Mar. 25, 1987 [JP] Japan .................................. 62-72056
Mar. 31, 1987 [JP] Japan .................................. 62-80236

[51] Int. Cl.$^5$ ............................................. G06F 15/20
[52] U.S. Cl. ..................................... 364/521; 340/703
[58] Field of Search ................. 364/518, 521; 340/703, 340/721, 723; 358/26, , 81, 82, 324, 334

[56] References Cited

U.S. PATENT DOCUMENTS

| | | | |
|---|---|---|---|
| 4,225,861 | 9/1980 | Langdon, Jr. et al. | 340/703 |
| 4,484,187 | 11/1984 | Brown et al. | 340/703 |
| 4,520,358 | 5/1985 | Makino | 340/799 |
| 4,564,915 | 1/1986 | Evans et al. | 364/521 |
| 4,608,596 | 8/1986 | Williams et al. | 358/81 |
| 4,635,048 | 1/1987 | Nishi et al. | 340/703 |
| 4,758,878 | 7/1988 | Frantz et al. | 358/81 |

OTHER PUBLICATIONS

Maeda et al., "Haisyoku Simyuresyon Soti" (Device for Simulating Color Arrangement), *Sen'i to Kogyo* (Textiles and Industry), vol. 36, No. 6, pp. 195-199 (1980).

Phong, "Illumination for Computer Generated Pictures", *Communications of the ACM*, vol. 18, No. 6, pp. 311-317 (Jun. 1975).

*Primary Examiner*—Heather R. Herndon
*Attorney, Agent, or Firm*—Foley & Lardner

[57] ABSTRACT

Based on a first color distribution which is formed by a first color in a color domain illuminated by an optical beam of a source color and is stored in a memory as picture elements, each representing an original color value, simulation is carried out for a second color distribution which will be formed in the color domain by a second color. For the first and second color distributions, a color space is defined by three primary colors with its origin used to represent black. An intermediate color value is calculated for each picture element with the original color values of the respective picture elements represented on a first color plane defined in the color space by the origin and the first and the source colors. By using the intermediate color values of the respective picture elements, new color values are calculated for the second color distribution with the new color values of the respective picture elements represented on a second color plane defined in the color space by the origin and the second and the source colors. Preferably, the intermediate color values are clustered into clusters representative of a predetermined number, such as 256, of discrete colors for use in representing the first and second color distributions by color codes assigned to the respective clusters.

4 Claims, 7 Drawing Sheets

FIG. 2
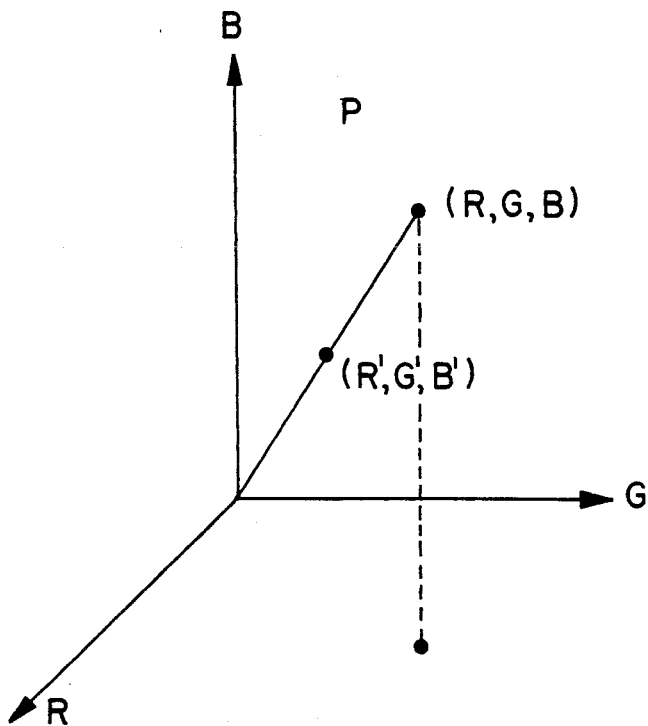
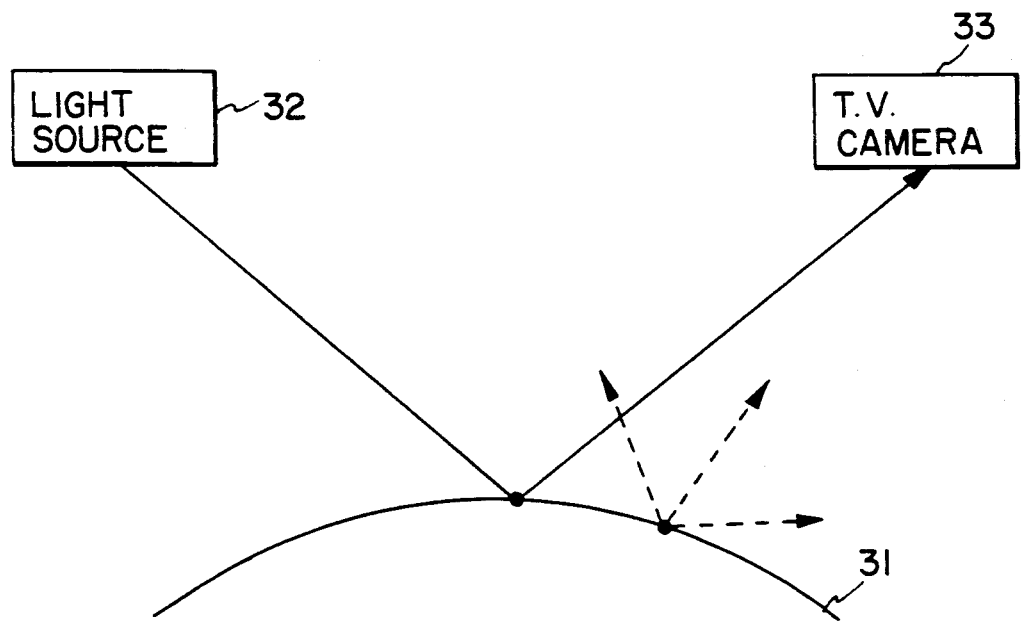
FIG. 3

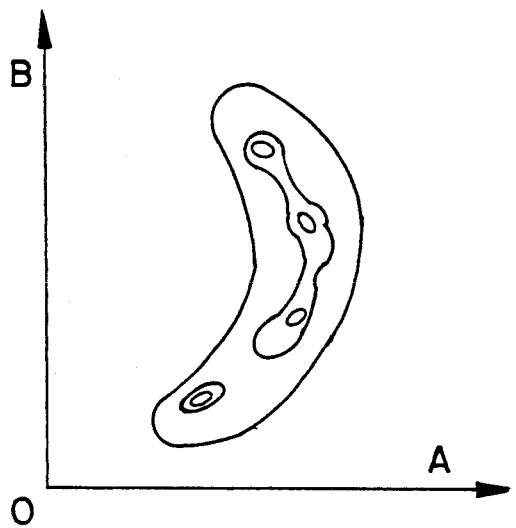
FIG. 11
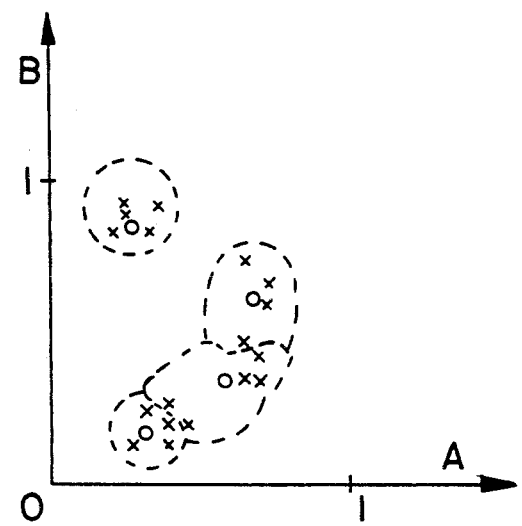
FIG. 12
| R | G | B | A | B | R' | G' | B' |
|---|---|---|---|---|----|----|----|
| 59 | 37 | 40 | 0.25 | 0.13 | 42 | 50 | 38 |
| 73 | 39 | 44 | 0.38 | 0.13 | 49 | 60 | 40 |
| 90 | 57 | 61 | 0.38 | 0.20 | 65 | 77 | 58 |
| 94 | 55 | 61 | 0.44 | 0.19 | 66 | 79 | 56 |
| 84 | 58 | 62 | 0.31 | 0.21 | 64 | 74 | 59 |
| 101 | 69 | 74 | 0.38 | 0.25 | 77 | 89 | 70 |
| 161 | 110 | 118 | 0.60 | 0.40 | 122 | 142 | 112 |
| 172 | 112 | 121 | 0.69 | 0.40 | 127 | 148 | 114 |
| 184 | 135 | 143 | 0.60 | 0.50 | 145 | 166 | 137 |
| 191 | 136 | 145 | 0.66 | 0.50 | 148 | 171 | 138 |
| 216 | 161 | 170 | 0.68 | 0.60 | 172 | 197 | 164 |
| 245 | 186 | 197 | 0.73 | 0.70 | 198 | 225 | 190 |
| 245 | 196 | 206 | 0.63 | 0.75 | 204 | 230 | 200 |
| 228 | 212 | 219 | 0.30 | 0.84 | 208 | 228 | 216 |
| 226 | 220 | 226 | 0.20 | 0.88 | 212 | 230 | 224 |
| 242 | 227 | 234 | 0.30 | 0.90 | 222 | 242 | 231 |
| 244 | 235 | 242 | 0.24 | 0.94 | 228 | 248 | 240 |
| 255 | 237 | 245 | 0.34 | 0.94 | 233 | 255 | 242 |
FIG. 13

SIMULATION OF A CHANGE IN THREE-COMPONENT COLOR VALUES BY USING TWO-COMPONENT COLOR VALUES

This application is a continuation of application Ser. No. 07/173,164, filed Mar. 25, 1988 now abandoned.

BACKGROUND OF THE INVENTION

This invention relates to a method and a device for use in simulating a change in color of a color domain of an object or material body.

Computer-aided design (CAD) is applicable to color design. It becomes often necessary on carrying out the color design to simulate a color change from an original color to a different color at a color domain of an object. The computer-aided design makes it possible to evaluate the color change without actually manufacturing the object with the original color varied in various manners at the color domain.

By way of example, let it be assumed that a color arrangement should be designed for a body of an automobile with the automobile used as the object and with the body used as the color domain and that the color domain is formed with a single original color. Under the circumstances, simulation may be carried out as follows.

A color television camera is used at first to pick up the object to produce an original color television signal representative of a colored original image of the object. A color cathode-ray tube is used to visually display the image. Subsequently, a computer system is used to deal with the television signal and to produce a changed color television signal which represents the image with the original color changed in various manners at the color domain.

For use in simulating a color change, a device is proposed in a paper contributed by Osami Maeda, Akihiko Ooe, and Masaki Fuse in Japanese to a technical periodical named "Sen'i to Kôgyô" (Textiles and Industry), Volume 36 (1980), No. 6, pages 195 to 199, under the title of "Haisyoku Simyurêsyon Sôti" (Device for Simulating Color Arrangement). In the manner which will later be described a little more in detail, the device may be effective in designing a color arrangement of either a woven fabric or the interior of a room. The device is, however, incapable of faithfully simulating a color distribution on a curved surface.

On the other hand, shading in computer graphics is discussed in an article contributed by Bui Tuong Phong to "Communications of the ACM," Volume 18, No. 6 (June 1975), pages 311 to 317, under the title of "Illumination for Computer Generated Pictures." According to the Bui Tuong Phong article, excellent shaded graphic displays are obtained not only for curved surfaces but also for objects made of transparent materials. The computer generated displays are, however, not applicable to colored objects directly as they stand.

SUMMARY OF THE INVENTION

It is therefore an object of the present invention to provide a method of calculating, in response to a first color distribution formed by a first color in a color domain of an object, a second color distribution formed by a second color in the color domain so as to simulate a color change as faithfully as possible even when the color domain lies on a curved surface of the object.

It is another object of this invention to provide a device for calculating, in response to a first color distribution formed by a first color in a color domain of an object, a second color distribution formed by a second color in the color domain so as to simulate a color change as faithfully as possible even when the color domain lies on a curved surface of the object.

In connection with the above-described objects of this invention, it should be understood that the color domain is illuminated by an optical beam, such as sunbeams, of a source color.

Other objects of this invention will become clear as the description proceeds.

According to an aspect of this invention, there is provided a method which is for use in calculating in response to a first color distribution formed by a first color in a color domain of an object a second color distribution formed by a second color in the color domain when the color domain is illuminated by an optical beam of a source color and which comprises the steps of: (A) making each of picture elements of an original image of the object represent an original color value in a color space defined in common to the picture elements by three primary colors and having an origin representative of black, the color domain being represented in the original image with relevant ones of the picture elements used as domain elements, the first color distribution being represented by the original color values of the respective domain elements; (B) calculating an intermediate color value of each of the domain elements with the original color values of the respective domain elements represented on a first color plane defined in the color space by the origin and the first and the source colors; and (C) calculating new color values of the respective domain elements in response to the intermediate color values of the respective domain elements and with the new color values represented in the color space on a second color plane defined by the origin and the second and the source colors, the second color distribution being represented by the new color values of the respective domain elements.

According to another aspect of this invention, there is provided a device which is for use in calculating in response to a first color distribution formed by a first color in a color domain of an object a second color distribution formed by a second color in the color domain when the color domain is illuminated by an optical beam of a source color and which comprises: (A) an original image memory for storing picture elements of an original image of the object with each of the picture elements used to represent an original color value in a color space defined in common to the picture elements by three primary colors and having an origin representative of black, the color domain being represented in the original image with relevant ones of the picture elements used as domain elements, the first color distribution being represented by the original color values of the respective domain elements; (B) a first color memory for storing the first color; (C) a second color memory for storing the second color; (D) a source color memory for storing the source color; (E) an intermediate calculator coupled to the image memory and the first and the source color memories for calculating an intermediate color value of each of the domain elements with the original color values of the respective domain elements represented on a first color plane defined in the color space by the origin and the first and the source colors; and (F) calculating means coupled to the second and the source color memories and the intermediate calculator for calculating new color values of the respective domain elements in response to the intermediate color values of the respective domain elements and with the new color values represented in the color space on a second color plane defined by the origin and the second and the source colors, the second color distribution being represented by the new color values of the respective domain elements.

BRIEF DESCRIPTION OF THE DRAWING

FIG. 2 is a schematic representation of a color space for use in describing operation of the device shown in FIG. 1;

FIG. 3 is a schematic representation of a part of an object in preparation for description of operation of a color change simulating device according to the instant invention;

FIG. 11 schematically shows an example of a content of a color position distribution memory which is used in the device illustrated in FIG. 10;

FIG. 12 schematically shows another example of the content mentioned in conjunction with FIG. 11;

FIG. 13 is a graphic representation of a result of calculation carried out by the device shown in FIG. 10;

DESCRIPTION OF THE PREFERRED EMBODIMENTS

Figure 1:
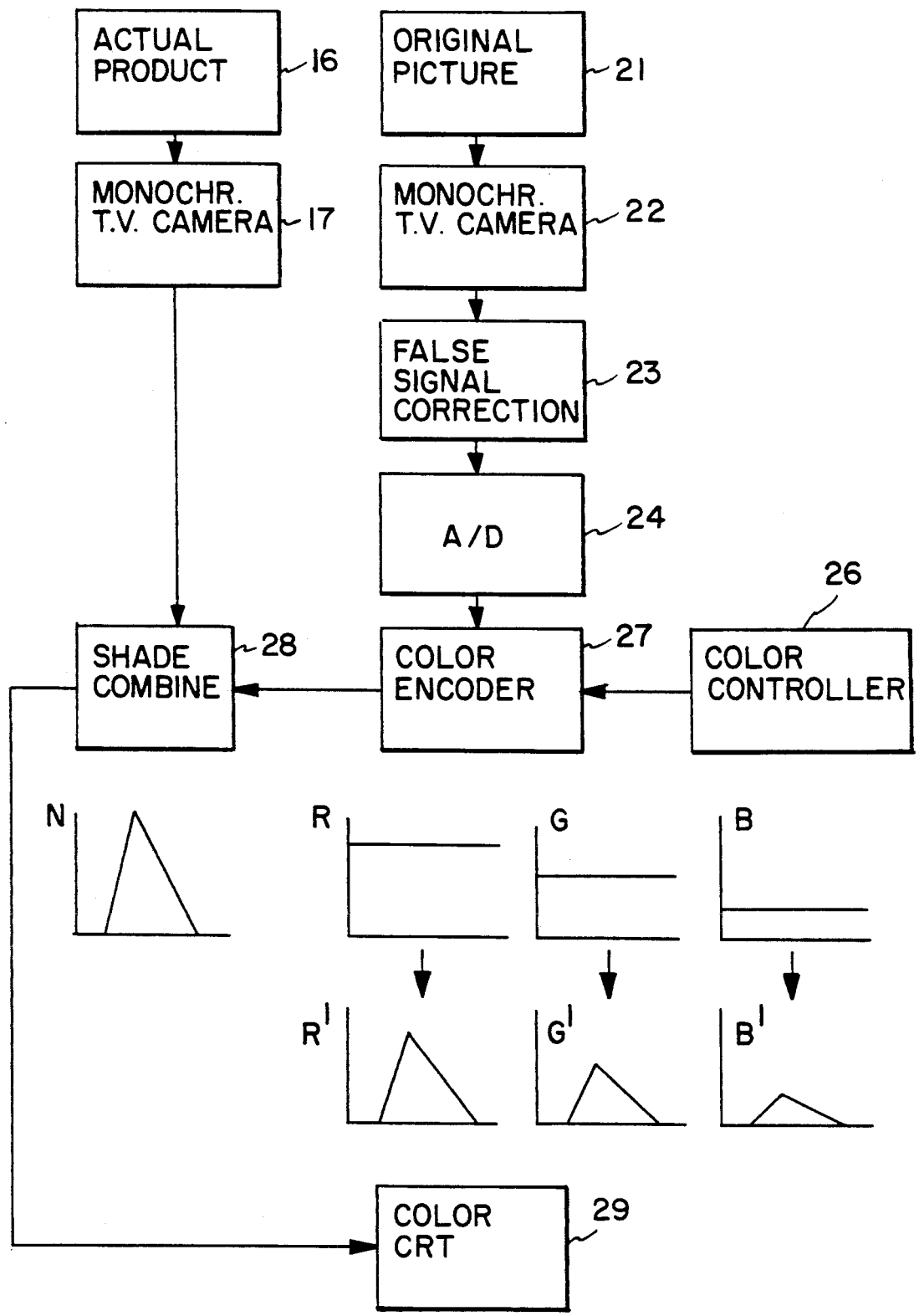
FIG. 1 shows, in blocks, a conventional color change simulating device together with several waveforms of signals used in the device.

Referring to FIG. 1 which is a substantial reproduction of one of eleven figures of the Maeda et al paper referred to hereinabove, a conventional color change simulating device will be described at first in order to facilitate an understanding of the technical merits achieved by the present invention. Although not described in greater detail in the Maeda et al paper, operation of the device would presumably be as follows.

An actual product is shown at 16. The product 16 is picked up by a monochromatic television camera 17 to provide a monochromatic product signal N representative of the product 16 with shading. The actual product 16 is, for example, a woven fabric or the interior of a room.

An original picture is shown at 21. The picture 21 is preliminarily designed to show the actual product 16 with those parts of the product 16 depicted in about eight monochromatic stages of thickness or blackness which should be differently colored during evaluation of color changes. Another monochromatic television camera 22 is used to provide a monochromatic picture image of the original picture 21. In order to exempt the picture image from false signals, such as noise, a false signal correcting circuit 23 is used to derive a monochromatic picture signal from the picture image. An analog-to-digital converter (A/D) 24 is used to divide the picture signal into sections in accordance with the respective monochromatic stages.

A color controller 26 is for producing a color signal representative of three primary colors with controllable intensities in the manner exemplified at R, G, and B. Responsive to the color signal and supplied with the sections from the converter 24, a color encoder 27 produces a colored picture signal in which the sections are differently colored. A shade combining circuit 28 is for superposing the monochromatic product signal N on the colored picture signal to provide a color image comprising color components exemplified at $R'$, $G'$, and $B'$. A color cathode-ray tube 29 is used in displaying the color image.

Turning to FIG. 2 which is not even remotely suggested in the Maeda et al paper, it appears that the device of Maeda et al is operable on a basic principle such that a color domain or region of the actual product has a color distribution which is primarily decided by an original color having a set of red, green and blue components R, G, and B in the three primary colors and secondarily by shading when the product has a single composition of matter at the color domain and, if colored, is so done with a single coloring material at the color domain. More particularly, the original color is represented by an original color vector which has a set of three vector components R, G, and B in a color space defined by the three primary colors and having an origin O (oh) representative of black. As a result of shading, the color distribution is eventually represented by various color vectors which share a common direction and a common sense with the original color vector and have eventual sets of vector components exemplified at $R'$, $G'$, and $B'$. Incidentally, an end point (R, G, B) of the original color vector is orthogonally projected onto the R-G plane of the color space in order to clearly show the end point in the color space.

The color vector is herein alternatively referred to as a color value. The vector components will alternatively be called three primary color components.

Further turning to FIG. 3 which is a slightly modified reproduction of one of ten figures of the Bui Tuong Phong article referenced heretobefore, it should be noted in connection with an actual object or body 31 that a light source 32 is used to illuminate the object 31 with an optical beam when the object 31 is either picked up by a television camera 33 or seen by a human visual organ. The optical beam may be sunbeams.

The optical beam is subjected to specular reflection at a particular part of the object 31 on entering the television camera 33 as specularly reflected light. The optical beam and the specularly reflected light proceed along an optical path depicted by solid lines. The particular part is picked up or seen as highlights. The particular part has a location on the object 31 dependent on positional relationships which the light source 32 and the television camera 33 have relative to the object 31. It is to be noted in this connection that the specularly reflected light has the source color of the optical beam and differs from the optical beam only in intensity. The source color will be represented by a source color vector $\bar{C}_s$, which will hereafter be written by C(S). The source color will be represented also by C(S). Such a notation will be used as regards each of other colors except in the drawing.

The optical beam is furthermore subjected to scattered reflection at various other parts of the object 31 to enter the television camera 33 as scattered light. For one of the various other parts, the scattered light is depicted by dashed lines. The scattered light has a color dependent on, for example, the source color, parts of the object 31, and an angle formed between a line of sight and a surface which the object 31 has at the above-mentioned one of the various other parts.

It is therefore possible to represent a color at a part of a color domain of the object 31 by a color vector C which is given by:

$$C = C(O) \cdot A + C(S) \cdot B, \quad (1)$$

where A and B represent local coefficients dependent locally on the part under consideration and C(O) represents a particular color vector representative of a particular color which the object 31 has at that part. The particular color is herein understood to be invariable throughout the color domain. Such a particular color is herein called an object color.

The Bui Tuong Phong article does not deal with colored objects. It is to be noted, however, that Bui Tuong Phong shows an equation which is similar to Equation (1). When compared with the equation introduced by Bui Tuong Phong, the coefficients A and B would be given by:

$$A = d + (1-d) \cdot \cos\phi,$$

and $$B = W(\phi) \cdot [\cos\theta]^n, \quad (2)$$

where $\phi$ represents the incident angle of the optical beam at the part under consideration, d represents a coefficient of scattered reflection of background light, $\theta$ represents an angle between the line of sight and the optical path of the specularly reflected light, n represents a number related to the specularly reflected light at the part in question, and $W(\phi)$ represents a ratio of the specularly reflected light and the optical beam as a function of the incident angle. In any event, the coefficients A and B need not be precisely defined insofar as concered with this invention.

Turning back to FIG. 2, the highlights of the actual product has the source color indicated at a particular point P in the color space. It is therefore understood that the color distribution does not distribute in practice merely along the original color vector as a result of shading alone but distributes on an area which includes the particular point P and the original color vector. As a result of such a color distribution, the device of Maeda et al can not faithfully simulate the color distribution which is actually seen with the human visual organ.

Figure 4:
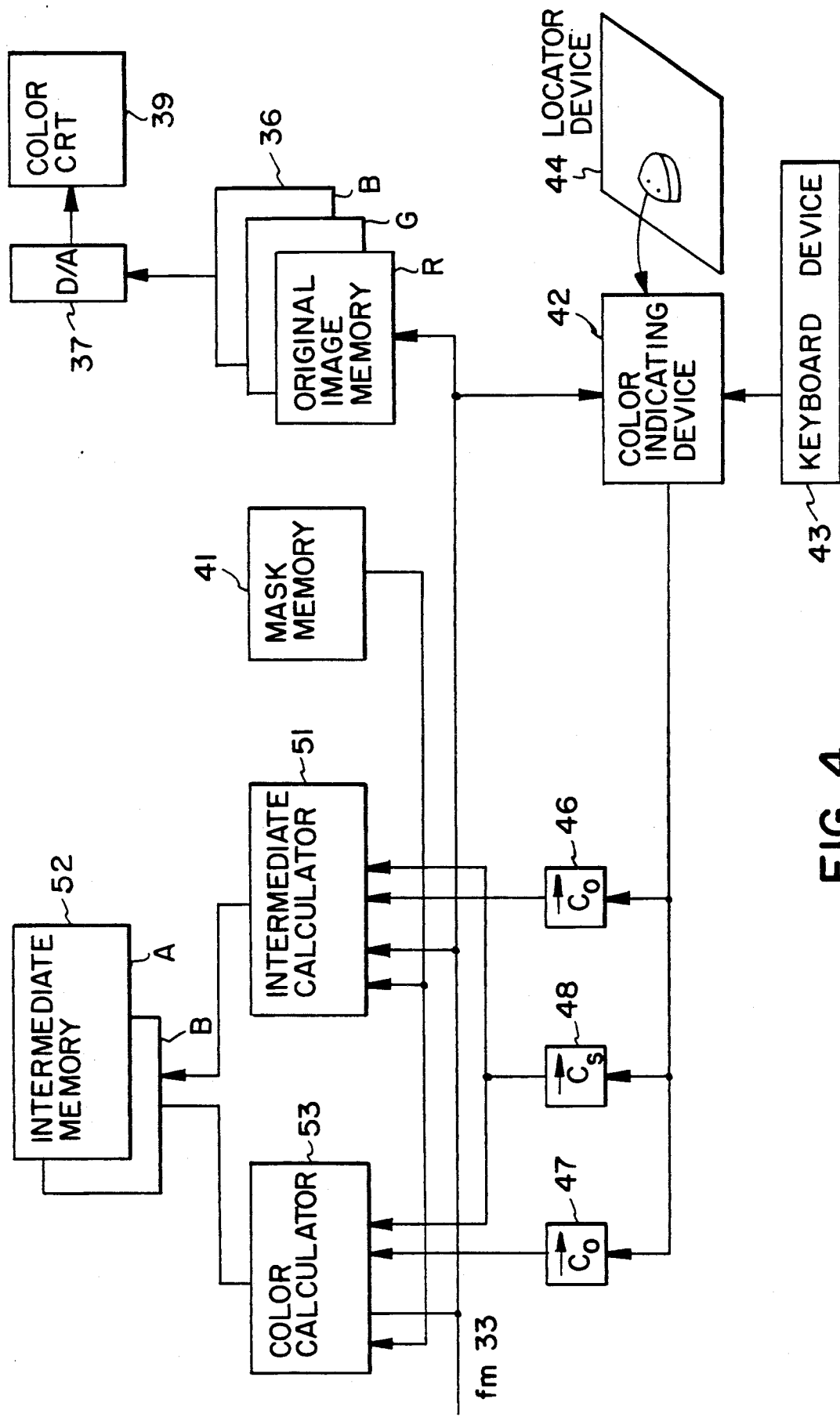
FIG. 4 is a block diagram of a color change simulating device according to a first embodiment of this invention.

Referring now to FIG. 4, attention will be directed to a color change simulating device according to a first embodiment of this invention. In the device, an original image memory 36 is for storing a colored original image of an object or body. On storing the original image in the image memory 36, a color television camera is used in the manner depicted in FIG. 3 at 33 to produce a color television signal which represents the object together with its background and has three primary color signal components dependent on the three primary colors, such as red R, green G, and blue B. The signal components are digitized for storage in the image memory 36 as sets of picture elements which will collectively be called a memory content of the image memory 36. A digital-to-analog converter (D/A) 37 is for making a color cathode-ray tube (color CRT) 39 visually display the memory content as a colored original picture.

It will be presumed merely for clarity of description that the sets of picture elements are stored in the original image memory 36 in accordance with an x-y orthogonal coordinate system horizontally parallel to an x-axis and vertically parallel to a y-axis. At each picture element position (x, y) of the coordinate system, one of the sets of picture elements consists of a picture element representative of a red original color value R(x, y), another picture element of a green original color value G(x, y), and still another picture element of a blue original color value B(x, y). For example, the picture elements are 512 and 512 in number horizontally and vertically for each of the three primary colors although the image memory 36 is depicted as a rectangular block.

It will be assumed throughout the following that each picture element represents the color values by eight binary bits. With attention directed to the picture elements of the original image memory 36, Equation (1) is rewritten into:

$$\begin{pmatrix} R(x,y) \\ G(x,y) \\ B(x,y) \end{pmatrix} = \begin{pmatrix} R(O) \\ G(O) \\ B(O) \end{pmatrix} \cdot A(x,y) + \begin{pmatrix} R(S) \\ G(S) \\ B(S) \end{pmatrix} \cdot B(x,y), \quad (3)$$

where R(O), G(O), and B(O) are representative of three primary color components of the above-described object color C(O). R(S), G(S), and B(S) represent three primary color components of the source color C(S). The coefficients A and B of Equation (1) are now modified into a pair of local coefficients A(x, y) and B(x, y) in view of its dependency on the picture element positions (x, y).

Such three primary color components or values of each set are herein referred to collectively as a color value. Depending on the circumstances, picture elements of each set are herein referred to collectively as a picture element.

Figure 5:
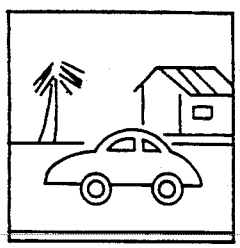
FIG. 5 visually shows an example of a colored original image used in the device illustrated in FIG. 4.

Turning to FIG. 5 during a short while, it will be surmised that the object is an automobile. The colored original image includes an image of the automobile.

Figure 6:
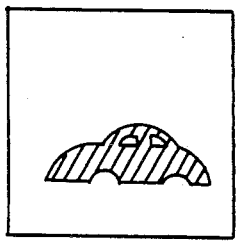
FIG. 6 visually shows an example of a mask image for use in relation to the original image exemplified in FIG. 5.

Further turning to FIG. 6, it will be moreover surmised that the automobile includes a body of a single object color and that the device should simulate a change in the object color from a first color to a second color. In other words, the body of the automobile is used as a color domain or region described before. A mask image is used, as depicted, to specify the color domain in the colored original image in the manner which will presently be described.

Turning back to FIG. 4, the mask memory 41 is for storing the above-mentioned mask image. Each picture element of the mask memory 41 is a one-bit element. A color indicating device 42 is coupled to the original image memory 36, a keyboard device 43, and a locator or pointing device 44 which is depicted as including a mouse known in the art. The color indicating device 42 is readily implemented by a microcomputer to be operable in the manner which will become clear as the description proceeds.

On storing the mask image in the mask memory 41, the colored original image is visually displayed as the colored original picture on the color cathode-ray tube 39. By watching the original picture, the mouse is manually moved along an outline of the color domain. Thereafter, a binary one bit is stored in the mask memory 41 as each picture element of the mask image. A binary zero bit is stored as each of other picture elements. The binary one and zero bits are stored by a device which is known in the art and is not depicted.

Merely for brevity of description, the picture elements of the color domain are herein called domain elements. In the manner pointed out hereinabove, the first color has a first color distribution in the color domain. The first color distribution is represented by Equation (3) with the first color used as the object color C(O) and when the picture element positions (x, y) are varied throughout the domain elements. Similarly, the second color has a second color distribution in the color domain. In the second color distribution, each domain element has a set of a red new color value R'(x, y), a green new color value G'(x, y), and a blue new color value B'(x, y).

It will be supposed that such sets of new color values are given by:

$$\begin{pmatrix} R'(x,y) \\ G'(x,y) \\ B'(x,y) \end{pmatrix} = \begin{pmatrix} R'(O) \\ G'(O) \\ B'(O) \end{pmatrix} \cdot A(x,y) + \begin{pmatrix} R(S) \\ G(S) \\ B(S) \end{pmatrix} \cdot B(x,y), \quad (4)$$

where R'(O), G'(O), and B'(O) are representative of three primary color components of the second color. In other words, it is supposed that the coefficients A(x, y) and B(x, y) do not depend on the object color of the color domain but are dependent only on a combination of a part corresponding on the object to each domain element position (x, y) and the positional relationship which the light source and the television camera have relative to the part under consideration. The new color values of each set are herein referred to collectively as a new color value.

Figure 7:
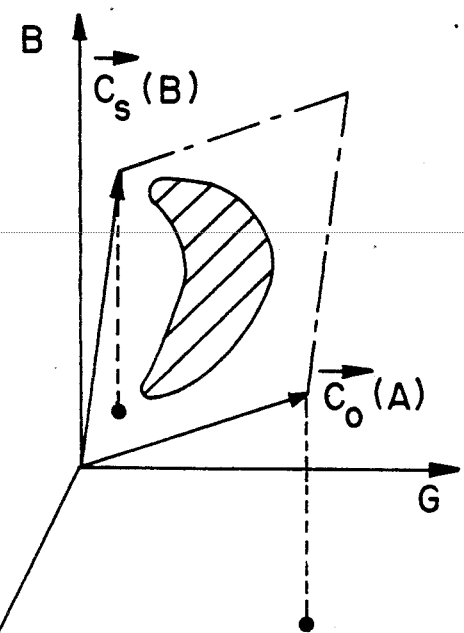
FIG. 7 is a schematic representation of a color space for use in describing operation of the device shown in FIG. 4.

Turning now to FIG. 7, the first color distribution is depicted as a hatched area in a color space which is defined by the three primary colors R, G, and B in common to the color values of the respective domain elements and has an origin O (oh) representative of black. In the color space, the first color is represented by a first color vector C(O) in the manner illustrated with an end point of the vector orthogonally projected onto the R-G plane of the color space. The source color is represented by a source color vector C(S) depicted together with a similar orthogonal projection.

More specifically, the first color distribution lies on a first color plane which is defined in the color space by the origin O and the first and the source colors C(O) and C(S). The three original color values R(x, y), G(x, y), and B(x, y) of the respective domain elements are on the hatched area and can consequently be represented by A and B coordinates or components of an A-B oblique coordinate system which has an A-axis along the first color vector and a B-axis coincident with the source color vector.

Figure 8:
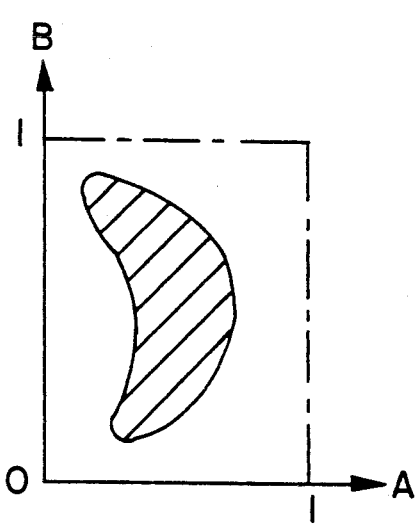
FIG. 8 is a schematic representation of a first color plane for use in describing operation of the device illustrated in FIG. 4.

Further turning to FIG. 8, the oblique coordinate system is mapped to an A-B orthogonal coordinate system. Each of the A and B components will be given a value between zero and unity. It is possible to understand in the manner which will again be discussed later in the description that the domain element positions (x, y) are distributed in the hatched area in compliance with a frequency distribution corresponding to the first color distribution, namely, on the manner in which the first color varies in the color domain.

Figure 9:
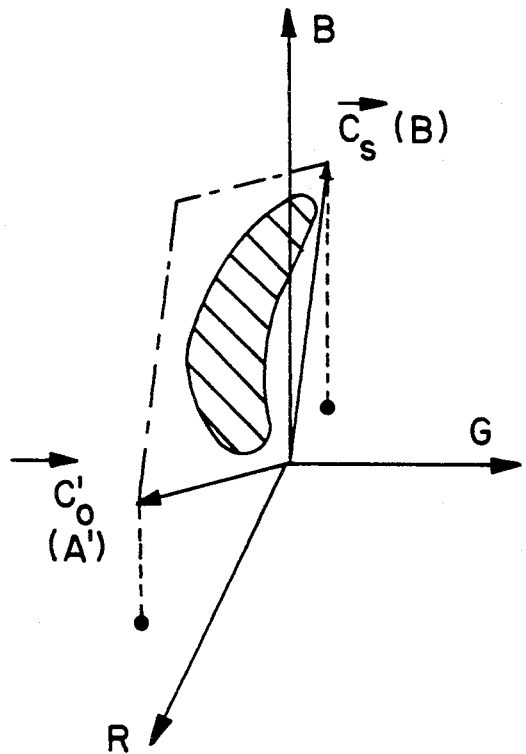
FIG. 9 is a schematic representation of a second color plane in the color space depicted in FIG. 7.

Still further turning to FIG. 9, the second color distribution is shown again as a hatched area in the color space which is depicted separately from that illustrated in FIG. 7. In such a color space, the second color is represented by a second color vector C'(O) which is depicted with an end point of the vector orthogonally projected onto the R-G plane of the color space. The second color distribution lies on a second color plane defined in the color space by the origin O and the second and the source colors C'(O) and C(S). The second color distribution can be represented by A' and B coordinates or components of an A'-B oblique coordinate system which has an A'-axis coincident with the second color vector with the B-xas kept untouched along the source color vector.

The hatched area of FIG. 9 will be mapped, in the manner described in conjunction with FIGS. 7 and 8, to a mapped area in an A'-B orthogonal coordinate system. It is possible to understand that the domain element positions (x, y) are distributed in the mapped area in accordance with the frequency distribution described above in connection with the first color distribution.

Referring back to FIG. 4, a first color memory 46 is for storing the first color C(O). A second color memory 47 is for storing the second color C'(O). A source color memory 48 is for storing the source color C(S). Each of the color memories 46 through 48 has a memory capacity of eight bits for each of the three primary colors.

It should be understood that the first and the source colors can hot be exactly decided with reference to the colored original picture. In practice, it is sufficient on storing the first color in the first color memory 46 to manually move the mouse of the locator device 44 so as to indicate a portion of the original picture that best looks like the first color. The second color is stored in the second color memory 47 either by the keyboard device 43 or by the locator device 44. The source color is stored in the source color memory 48 by manually moving the mouse so as to indicate a portion that looks as highlights in the original picture. When no highlights are visible in the original picture, the source color is stored in the source color memory 48 by giving a color value of 255, namely, eight binary one bits, to each of the three primary colors.

It is now possible to simulate the second color distribution if the local coefficients A(x, y) and B(x, y) could be decided for each domain element position (x, y). For use in calculating the coefficients, an additional color vector C(D) will be introduced perpendicularly of the first and the source color vectors as by a vector product of the first and the source color vectors. It will be assumed that the additional color vector has three primary color components R(D), G(D), and B(D).

Each set of the three primary color values of the first color distribution is now represented for the domain element position (x, y) by:

$$\begin{pmatrix} R(x,y) \\ G(x,y) \\ B(x,y) \end{pmatrix} = \begin{pmatrix} R(O) R(S) R(D) \\ G(O) G(S) G(D) \\ B(O) B(S) B(D) \end{pmatrix} \begin{pmatrix} A(x,y) \\ B(x,y) \\ D(x,y) \end{pmatrix}, \quad (5)$$

where D(x, y) represents an additional coefficient for each domain element position (x, y) to give a distance which the color of the domain element has relative to the first color plane described before. It is possible to understand that the additional coefficients represent a noise component.

The local coefficients A(x, y) and B(x, y) are calculated from Equation (5). The additional coefficient D(x, y) need not be calculated. When Equation (5) is solved to get the coefficients A(x, y), B(x, y), and D(x, y), the following equation is obtained:

$$\begin{pmatrix} A(x,y) \\ B(x,y) \\ D(x,y) \end{pmatrix} = \begin{pmatrix} R(O) R(S) R(D) \\ G(O) G(S) G(D) \\ B(O) B(S) B(D) \end{pmatrix}^{-1} \begin{pmatrix} R(x,y) \\ G(x,y) \\ B(x,y) \end{pmatrix}. \quad (6)$$

A group of numerical examples will be given later in the description in connection with the first and the source colors, the additional vector, the first factor in the right-hand side of Equation (6), and others.

In FIG. 4, an intermediate calculator 51 is coupled to the original image memory 36, the mask memory 41, and the first and the source color memories 46 and 48 and is for scanning the mask memory 41 to select the domain elements from the picture elements of the colored original image and for calculating the coefficients A and B (arguments omitted) for the respective domain elements according to Equation (6). Each coefficient A or B may be represented by eight or more (such as thirty-two) binary bits. Coupled to the intermediate calculator 51, an intermediate memory 52 is for storing the coefficients A and B according to the x-y coordinate system.

A color calculator 53 is coupled to the mask memory 41, the second and the source color memories 47 and 48, and the intermediate memory 52 and is for scanning the mask memory 41 to decide the domain elements and for calculating the new color value of each domain element as a calculated color value in compliance with Equation (4). It should be noted in connection with Equation (4) that new color value of each domain element is calculated by using the coefficients A and B calculated for the domain element under consideration. In the example being illustrated, the color calculator 51 is further coupled to the original image memory 36 to substitute the second color distribution for the first color distribution in the original image with the calculated color value substituted for the original color value which the domain element in question has in the original image.

It is possible to refer to the coefficients A and B for each domain element collectively as an intermediate or intermediary color value. The intermediate calculator 51 is therefore for calculating the intermediate color values of the respective domain elements with the original color values of the respective domain elements represented on the first color plane described before. The intermediate memory 52 is for storing the intermediate color values as stored color values in correspondence to the respective domain elements.

The original image memory 36 is used in FIG. 4 dually as a changed image memory arrangement for storing a changed color image in which the second color distribution is substituted for the first color distribution. A combination of the intermediate memory 52, the color calculator 53, and the changed image memory arrangement serves as a calculating arrangement for calculating the new color values of the respective domain elements in response to the intermediate color values of the domain elements with the new color values represented in the color space on the second color plane described above. Incidentally, it is possible to understand that the mask memory 41 is included in the original image memory 36.

Reviewing FIGS. 4 through 9, it will readily be understood that the intermediate and the color calculators 51 and 53 can be implemented by a microcomputer. It has been confirmed that the second color distribution is faithfully simulated by the device illustrated with reference to FIGS. 4 to 9. It should, however, be noted that an appreciable time is necessary during calculation of Equation (4) for the respective domain elements. This is objectionable when evaluation of the color change should be carried out as regards a number of "second" colors.

Figure 10:
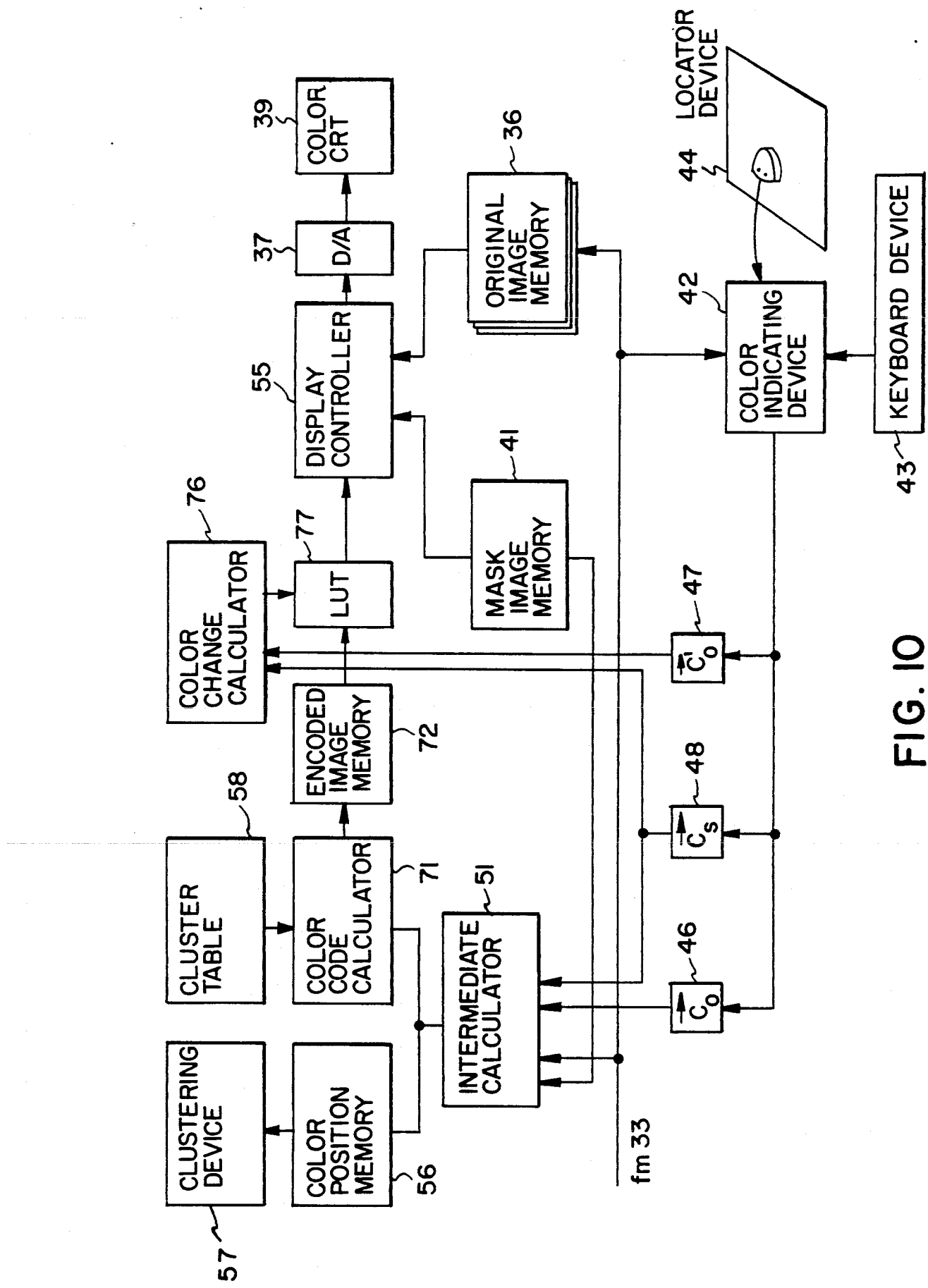
FIG. 10 is a block diagram of a color change simulating device according to a second embodiment of this invention.

Referring now to FIG. 10, the description will proceed to a color change simulating device according to a second embodiment of this invention. The device comprises similar parts designated by like reference numerals and is operable with likewise named signals except for the signals used in calculating Equation (4). This is in order to simulate the color change in a short interval of time. For this purpose, the first color distribution is described by using a small predetermined number of discrete colors, such as 256 discrete colors, in the manner which will become clear as the description proceeds. Incidentally, the original image memory 36 is connected to the digital-to-analog converter 37 indirectly through a display controller 55 connected, in turn, to the mask memory 41 and another circuit element which will later be described.

Turning temporarily to FIG. 11, the hatched area of FIG. 8 is illustrated with no batches but with contour lines as a contoured area. In the manner described before, each domain element (x, y) corresponds in the contoured area to a color position which represents the intermediate color value of the domain element under consideration, namely, which is indicated by a pair of coefficients A and B related to the domain element in question. Such color positions are distributed in the contoured area densely at a certain locality and sparsely at another locality depending on the domain elements. In other words, the color positions have a frequency distribution which depends on the domain elements. It is possible to understand the frequency distribution alternatively as an intermediate color distribution.

Each contour line indicates a certain frequency of occurrence of the intermediate color values. It will be seen that the color positions are dense to have a high frequency usually only in several localities. It has been confirmed that a few number of discrete colors are sufficient to represent the colors in the second color distribution when the frequency is low. On the contrary, a great number of discrete colors are desirable for representing the colors of the second color distribution for the color positions of a high frequency. In other words, the second color distribution should preferably be represented by using most of the discrete colors only at the color positions which are densely distributed. In order to properly assign the discrete colors to various color positions, clustering is carried out on the frequency distribution of the color positions in the manner which will shortly be described.

Referring back to FIG. 10, a color position distribution memory 56 is coupled to the intermediate calculator 51. A color position is stored in the color position distribution memory 56 in correspondence to each domain element to indicate the intermediate color value of that domain element in accordance with the A-B coordinate system, which is preferably the orthogonal one. As a consequence, the frequency distribution of the color positions is stored in the color position distribution memory 56 as a stored frequency distribution in the manner exemplified in FIG. 11. It is to be noted that the color position distribution memory 56 is labelled in FIG. 10 with the word "distribution" omitted.

A clustering device 57 is coupled to the color position distribution memory 56 and is for clustering an entire data set of the color positions of the respective domain elements into a plurality of clusters with reference to the stored frequency distribution. Inasmuch as the clusters should later be assigned with the respective discrete colors, the clusters are equal in number to the predetermined number used for the discrete colors. In the manner which will shortly become clear, the clustering device 57 is preferably implemented by a microcomputer and produces cluster data descriptive of the clusters. A cluster table 58 is coupled to the clustering device 57 and is for memorizing the cluster data.

Turning to FIGS. 12 and 13 for the time being, it will be supposed that there are only eighteen domain elements for a color domain of an object and that the first color has a certain color distribution at the eighteen domain elements. More particularly, let the three primary color components R(O), G(O), and B(O) of the first colors be 115, 20, and 30 and let the three primary color components R(S), G(S), and B(S) of the source color be 230, 245, and 250. Under the circumstances, the three primary color components R(D), G(D), and B(D) of the additional color vector become (−2350), (−21850), and 23575. In the right-hand side of Equation (6), the first factor becomes:

$$\begin{pmatrix} 0.0108194 & -0.0057857 & -0.0042839 \\ -0.0010850 & 0.0026777 & 0.0023738 \\ -0.0000023 & -0.0000210 & 0.0000227 \end{pmatrix}.$$

Under the circumstances, let the first color distribution result in the original color values R(x, y), G(x, y), and B(x, y) at each of the eighteen domain elements in the manner depicted in FIG. 13. In this event, the intermediate color value A(x, y) and B(x, y) becomes as shown in FIG. 13. As a result, the eighteen domain elements are distributed at discrete color positions in the manner indicated in FIG. 12 by crosses. In such a case, the frequency distribution is clustered into four clusters depicted by dashed lines. In each cluster, the color positions have an average position indicated by small solid-line circles.

Incidentally, it may be presumed that the second color has the three primary color components R'(O), G'(O), and B'(O) of 50, 73 and 20. When the first and the source colors have the above-exemplified components, Equation (4) gives the new color value R'(x, y), G'(x, y), and B'(x, y) at each of the eighteen domain elements in the manner illustrated in FIG. 13.

Figure 14:
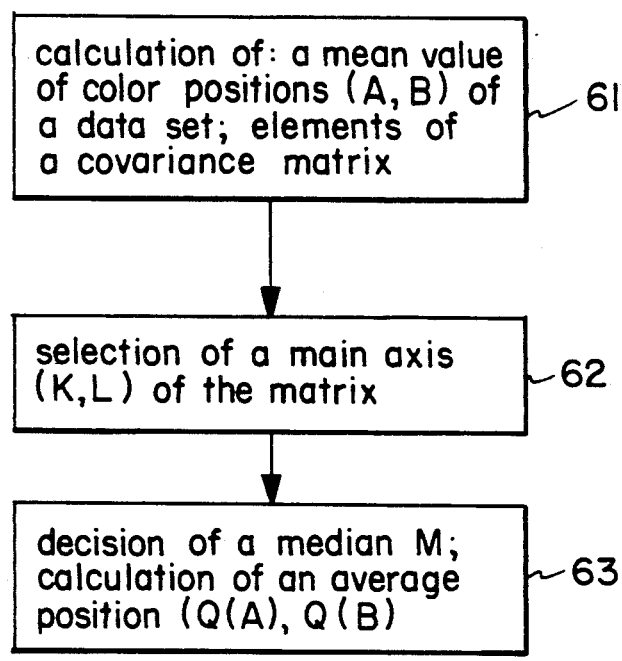
FIG. 14 shows a flow chart for use in clustering the content mentioned in connection with FIG. 11.

Referring to FIG. 14, it is surmised that the entire data set of color positions should be clustered into 256 clusters. In this event, the clustering device 57 clusters the entire data set in first through eighth stages. In the first stage, the entire data set is clustered into two clusters. In the second stage, the color positions in each of the two clusters are used as a partial data set of color positions. Each partial data set is clustered into two clusters. The entire data set is now clustered into four clusters. In this manner, the 256 clusters result in the eighth stage from the entire data set. Each of the entire data set and the partial data sets will be referred to merely as a data set in the description which follows as regards each of the eight stages.

At a first step 61, the clustering device 57 calculates a mean value of the color positions of a data set, namely, a pair of mean values of the coefficients A and B of the data set. The clustering device 57 furthermore calculates matrix elements of a covariance matrix in connection with the color positions of the data set.

It is known in the art that the matrix elements are arranged in the covariance matrix along two principal axes. The clustering device 57 selects at a second step 62 one of the principal axes as a main axis, along which the matrix elements have a greatest variance. The main axis is defined by its A and B vector components K and L.

At a third step 63, the clustering device 57 calculates a distribution graph, such as a histogram, of orthogonal projections of the respective color positions of the data set onto the main axis. A median M is decided with reference to the distribution graph for use in clustering the data set into two clusters at the median M. In each of the two clusters decided in this manner, the clustering device 57 calculates an average position Q of the color positions, namely, a pair of average components Q(A) and Q(B) of the respective color positions in the cluster under consideration.

The clustering device 57 produces the vector components K and L, the medians M, and the average positions Q for the respective clusters as the cluster data. The average position Q of each cluster represents one of the discrete colors that should be used as a common color of the color positions of the cluster in question. It is now possible to understand that each of the 256 clusters is identified by an eight-bit color code. Such color codes are therefore assigned to the respective clusters. In FIG. 12, the small solid-line circles represent such average positions for the four clusters.

Figure 15:
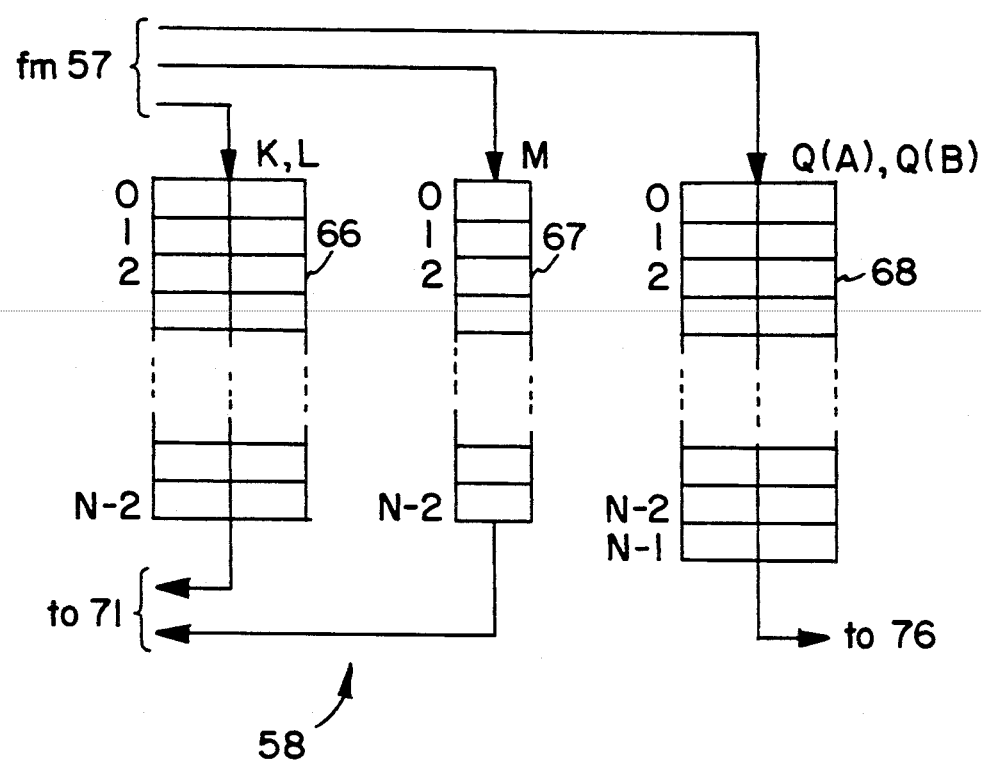
FIG. 15 shows a content of a cluster table which is used in the device depicted in FIG. 10.

Turning to FIG. 15, it should be pointed out in connection with a plurality of clusters, N in number, that sets of the vector components K and L and the medians M are (N−1) in number and that the average positions Q are N in number. The cluster table 58 has a first memory section 66 for storing the vector components K and L, a second memory section 67 for the medians M, and a third memory section 68 for the average components Q(A) and Q(B).

Turning back to FIG. 10, a color code calculator 71 is coupled to the intermediate calculator 51, the cluster table 58, and an encoded image memory 72. As soon as the cluster data are stored in the cluster table 58, the color code calculator 71 makes the intermediate calculator 51 again scan the mask memory 41 to select the domain elements from the picture elements of the original image stored in the original image memory 36. The encoded image memory 72 is for storing an encoded image in accordance with the picture element positions (x, y).

With reference to the first and the second memory sections 66 and 67 of the cluster table 58 in connection with each domain element, the color code calculator 71 decides one of the 256 clusters in eight stages that includes the color position of the domain element in question. The color code calculator 71 thereby decides one of the color codes as a selected code that is assigned to the cluster including the color position of the domain element being dealt with. Such selected codes are stored in the encoded image memory 72 at the picture element positions (x, y) of the respective domain elements to provide the encoded image. It is now understood that the domain elements of the encoded image represent the color codes assigned to the clusters into which the color positions of the respective domain elements are clustered.

A color change calculator 76 is coupled to the second and the source color memories 47 and 48 and the cluster table 58. According to Equation (4) in which the average components Q(A) and Q(B) of each cluster are used in place of the local coefficient pair A(x, y) and B(x, y) for the domain element having the color position in the cluster under consideration, the color change calculator 76 calculates a table color value R(T), G(T), and B(T) which sould be used after the color change as the new color values R'(x, y), G'(x, y), and B'(x, y) of the domain element in question. A look-up table (LUT) 77 is coupled to the color change calculator 76 and is for storing a correspondence table which shows the table color values in correspondence to the respective color codes.

The look-up table 77 is coupled to the encoded image memory 72 and, as the afore-mentioned circuit element, to the display controller 55. When put into operation, the display controller 55 refers to the mask memory 41 as regards each picture element which should be visually displayed on the color cathode-ray tube 39.

It will be assumed that the mask memory 41 stores the binary one bit at the picture element position of the domain element being dealt with. The display controller 55 makes the encoded image memory 71 produce the color code of the encoded image as an output code from the picture element position of the picture element under consideration. The look-up table 77 converts the output code to the new color value. The display controller 55 delivers the new color value to the color cathode-ray tube 39 through the digital-to-analog converter 37 for the picture element in question. When the mask memory 41 stores the binary zero bit, the display controller 55 delivers the picture element under consideration from the original image memory 36 to the color cathode-ray tube 39 through the digital-to-analog converter 37 like in the case where the mask memory 41 stores the binary one bit.

In this manner, the encoded image is transformed into a changed color image in which the color codes are changed to the new color values. The color cathode-ray tube 39 visually displays a colored picture of the object together with its background with the second color distribution substituted for the first color distribution.

Even when the second color should be further changed to different colors, the cluster table 58 and the encoded image memory 72 need not be touched but can be kept as they are. It is only necessary with the color change calculator 76 to calculate the table color values afresh for the respective color codes by 256 times calculating Equation (4) as regards each of the different colors by using the source color and 256 average component pairs Q(A) and Q(B) and to rewrite the look-up table 77 so that the correspondence table shows the afresh calculated table color values in correspondence to the respective color codes.

The color change simulating device can therefore very quickly simulate the color change to various colors when manufactured in compliance with the description made with reference to FIGS. 10 through 15. Incidentally, only 256 discrete colors are sufficient for simulating a single color domain particularly if clustering is carried out on the color positions, namely, on the intermediate color values.

Reviewing FIGS. 10 through 15, it is now understood that a combination of the color position distribution memory 56, the clustering device 57, and the cluster table 58 serves as a clustering arrangement for clustering the intermediate color values of the respective domain elements into a plurality of clusters which represent discrete colors, respectively. Another combination of the color code calculator 71 and the encoded image memory 72 serves as an image producing arrangement for producing an encoded image in which the domain element represent a plurality of color codes assigned to the respective clusters. Still another combination of the color change calculator 76 and the look-up table 77 serves as a table forming arrangement for forming a correspondence table which shows a plurality of table color values in correspondence to the respective color codes. By the use of the table forming arrangement, the table color values are desiredly changeable with neither the color codes touched in the encoded image memory 72 nor the cluster data touched in the cluster table 58. The table color values are for use as the new color values for displaying the above-mentioned changed color image on the color cathode-ray tube 39.

While this invention has thus far been described in specific conjunction with only two preferred embodiments thereof, it will now be readily possible for one skilled in the art to carry this invention into effect in various other manners. For example, it is possible in FIG. 4 to use a changed color image memory in addition to the original image memory 36 and to store the above-mentioned changed color image in the changed color image memory. On interpreting the appended claims, it is possible to understand that the changed color image memory is depicted in FIG. 10 as a combination of the encoded image memory 72 and the look-up table 77. The color domain need not be continuous but may be discretely distributed on the object.

As a further example, it is possible to simultaneously evaluate the color change in two or more color domains. When the color change simulating device is manufactured in compliance with the description given with reference to FIGS. 4 through 10, the use of a corresponding number of mask memories is necessary. Alternatively, each picture element should be represented in the mask memory 41 by a corresponding number of bits. When the color change simulating device is manufactured in accordance with the description made with reference to FIGS. 10 through 15, the look-up table 77 should be loaded with a corresponding number of correspondence tables. The cluster table 58 should have a corresponding number of sets of the first through the third memory sections 66 to 68. In the manner pointed out above, the encoded image memory 72 serves well even when the color domains are two or more in number.

What is claimed is:

1. A method for displaying colored pictures simulating changes in the color of an object from a first color to a second color, comprising the steps of:

producing image signals representing an image of said object while said object is illuminated by an optical beam of a source color;

storing said image signals in an image memory as a plurality of picture elements forming an original image, said picture elements and a mask stored in a mask image memory defining a plurality of domain elements representing a color domain of said object, said domain elements representing an original color value in a color space defined by three primary colors with an origin of said color space corresponding to the color black, a first color distribution of said object represented in said image memory by original color values of domain elements on a first color plane defined by said origin, said source color, and said first color;

generating intermediate color local values for each domain element based on said original color values stored in said image memory;

storing said intermediate color values in an intermediate memory;

generating new color values of said domain elements based on said intermediate color values stored in said intermediate memory, said new color values represented as domain elements on a second color plane defined by said origin, said source color, and said second color, said new color values defining a second color distribution of said object; and displaying a colored picture of said object having said second color distribution on a display, based on said new color values.

2. A method as claimed in claim 1, wherein said producing step includes producing image signals representing a curved surface of said object and wherein said displaying step includes displaying said curved surface having said second color distribution.

3. A method as claimed in claim 1, wherein said generating new color values step includes generating a new color value for each of said domain elements in response to one of said intermediate color values generated for said each of said domain elements.

4. A method as claimed in claim 1, wherein said generating new color values step comprises the steps of:

clustering said intermediate color values into a number of clusters corresponding to discrete colors;

generating an encoded image in which domain elements represent a plurality of color codes assigned to said discrete colors; and wherein said displaying step includes displaying a colored picture of said object based on said encoded image.

* * * * *